June 9, 1953     C. B. KEYS     2,641,287
APPARATUS FOR CUTTING THREADS
Filed Nov. 21, 1949

CLARENCE BRANT KEYS,
INVENTOR.

BY

ATTORNEY.

Patented June 9, 1953

2,641,287

UNITED STATES PATENT OFFICE 2,641,287

APPARATUS FOR CUTTING THREADS

Clarence Brant Keys, Sherman Oaks, Calif.

Application November 21, 1949, Serial No. 128,543

2 Claims. (Cl. 142—35)

This invention relates generally to an improved apparatus to be used in conjunction with a conventional lathe for cutting screw threads and more specifically relates to such an apparatus adapted to cut threads in non-metallic cylindrical objects.

Cutting threads in non-metallic objects, and particularly in wooden objects, has presented problems not heretofore satisfactorily solved. Prior cutters have not been adapted to rapidly make smooth cuts, with the result that rough surfaces and burrs remain on the threads after the cutting operation and devices for rapidly cutting threads have not been available. Snug fitting of male and female members threaded together is thus made impossible without a sanding or polishing operation following cutting.

My novel cutting tool is adapted to be used in conjunction with a conventional lathe equipped with a carriage selectively engageable with a lead screw so that the carriage may be moved longitudinally of the lathe in timed relation to the rotation of the lathe chuck. The tool of my invention is rotated by an auxiliary motor at very high speed, and the cutting blades exert a shaving effect to remove only a very thin slice of material with each stroke. The blades are designed to cut, sequentially, one side of a thread and then the other, and the blades are raked back to provide a small angle of clearance so that the portion of each blade immediately trailing the cutting edge performs a polishing operation on a minute section of the work piece or object on which a thread is being cut.

The cutting tool of my invention may be made to form internal threads with as great facility as external threads, and the depth of threads cut on either male or female objects may be selectively adjusted by the operator to any value within the range of the tool.

The principal purpose of my invention is therefore to disclose an apparatus including a novel cutter for cutting screw threads.

Another object is to disclose such an apparatus wherein the cutter is rotated at a speed very much greater than the speed of rotation of the work piece.

A further object is to disclose a thread-cutting apparatus including a cutter which is adapted to sequentially cut one side and then the other of a screw-thread in rapid succession.

A further object is to provide an apparatus, including a cutter, having the above characteristics and adapted to form a thread of any desired depth within the range for which the cutter is designed.

Another object is to disclose a thread-cutting tool adapted to form internal threads as well as external threads on non-metallic objects.

Other objects and advantages will become apparent from the following description of an exemplary form of the invention taken in connection with the accompanying drawing, in which.

Figure 1:
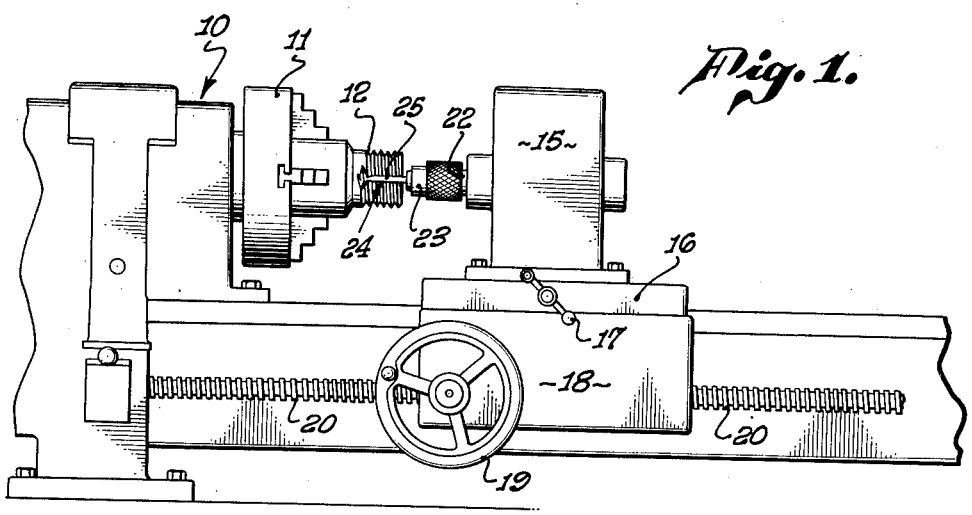
Fig. 1 is a side elevational view of a lathe with the apparatus of my invention in position for cutting a thread.

Generally speaking, my invention contemplates the use of a lathe equipped with a conventional carriage longitudinally movable on the bed of the lathe, the carriage having mounted thereon a high-speed motor driving a cutter in engagement with the work piece carried by the chuck of the lathe.

Referring in detail to the drawing, a lathe indicated in its entirety by 10 has a conventional chuck 11 adapted to hold a work piece 12. Motor 15 is mounted on cross-slide 16 and is adapted to be moved transverse to the axis of lathe 10 in a horizontal plane by hand crank 17. The entire carriage assembly 18 may be moved parallel to the axis of chuck 11 either manually by hand wheel 19 or automatically by connection to lead screw 20. Motor 15 is mounted so that its output shaft 22 is parallel to the axis of chuck 11.

Secured to shaft 22 of motor 15 is tool-holding chuck 23, which firmly engages shank 25 of cutter 24. Movement of carriage 18 transverse or longitudinal of lathe 10 thus correspondingly moves cutter 24, and the longitudinal axis of cutter is maintained parallel to the axis of chuck 11 at all times.

Figure 4:
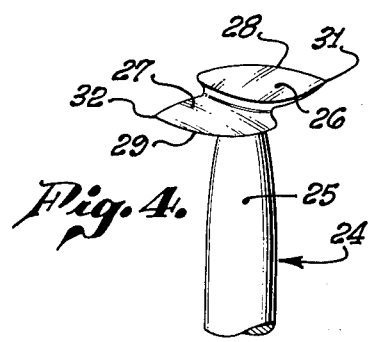
Fig. 4 is a fragmentary perspective view of the two blades and part of the shank of the cutter.

As best seen in Fig. 4, cutter 24 is provided at one end with two blades 26 and 27. Each blade has a cutting edge indicated at 28 and 29 respectively and outermost points 31 and 32. The line joining outermost points 31 and 32 is perpendicular to the axis of shank 25 of cutter 24.

Figure 2:
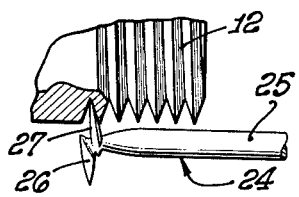
Fig. 2 is a fragmentary plan view, partly in section, showing the cutting operation of one blade of the cutter.
Figure 3:
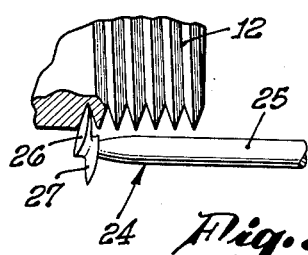
Fig. 3 is a view similar to Fig. 2 but showing the cutting operation of the other blade of the cutter.

With particular reference to Fig. 2, cutter 24 is shown with blade 27 cutting one side of a thread in work piece 12. Similarly, in Fig. 3 the other blade 26 of cutter 24 is shown cutting the opposite side of the same thread. Motor 15 is arranged to rotate cutter 24 at a speed many times greater than the speed of rotation of chuck 11 and work piece 12, and therefore two successive cuts taken by blades 26 and 27 in cutting a thread are made at nearly the same location in work piece 12.

Figure 5:
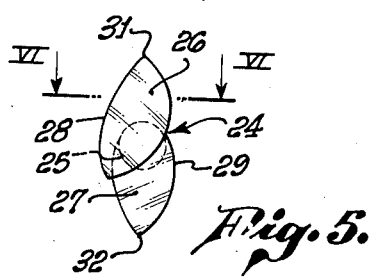
Fig. 5 is an end view of the cutter.
Figure 6:
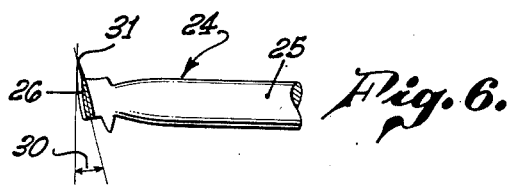
Fig. 6 is a fragmentary view taken on line VI—VI of Fig. 5.

As best seen in Figs. 4 and 5, cutting edges 28 and 29 of blades 26 and 27 are curved in outline. Each cutting edge lies in a plane and the planes of the two cutting edges are parallel to each other. These parallel planes are inclined to a plane normal to the axis of shank 25 in two coordinates. First, as clearly shown in Figs. 2 and 3, the apparent inclination of the cutting edge planes to the said normal plane as projected on the coordinate plane represented by the plane of the drawing is at an angle equal to one-half the root angle of the thread being cut. Secondly, with particular reference to Fig. 6, the angular inclination of the cutting edge planes with respect to the said normal plane as projected on the coordinate plane represented by the plane of the drawing in Fig. 6 is a small clearance angle, indicated at 30. I have found that a clearance angle, as thus defined, of from 10° to 20° gives desirable results. In general, the clearance angle should be smaller for the harder woods.

It was pointed out above that a line joining outermost points 31 and 32 of blades 26 and 27 is perpendicular to the axis of shank 25. It can therefore be seen that said outermost points will cooperatively cut the root of a screw thread, and because of the high speed of rotation of cutter 24 relative to the speed of rotation of work piece 12, points 31 and 32 will make successive cuts at almost the same point in work piece 12. In cutting threads, carriage 18 is moved along the bed of lathe 10 in timed relation with the rotation of chuck 11 by the action of lead screw 20 in familiar manner. Thus motor 15 and cutter 24 are carried toward chuck 11 and work piece 12 by the leftward movement of carriage 18, and cutter 24 will cut a smooth helical thread on work piece 12.

I have found that when work piece 12 is between 1" and 2" in diameter, composed of wood, plastic or similar material, and is rotated at about 60 revolutions per minute, my cutter should be driven at a speed between about 10,000 and 30,000 revolutions per minute. In general, the more rapidly the cutter is rotated relative to the work piece, the smoother will be the finished thread. It can be readily understood that each cut made by the shaving action of the rapidly rotating cutter 24 removes a very thin layer of material from work piece 12. After each cut the outer surface of each blade immediately trailing the cutting edge thereof performs a polishing function on the side of the thread just cut.

Thus I have provided a cutting tool capable of producing a smooth thread, cove, shoulder or groove in objects of wood and other material of similar characteristics and adapted to cut male or female threads with equal facility with a shaving action. It will be apparent to those skilled in the art that certain changes and modifications can be made without departing from the spirit of the present invention. All such modifications are intended to be embraced within the scope of the appended claims.

1. A milling tool for cutting threads in a rotatable work piece comprising: a rotatable shank provided with a pair of symmetrically disposed, radially extending blades, each blade having an outer surface lying in a plane deviating from a plane perpendicular to the axis of the shank by one-half the root angle of thread to be cut, said surfaces facing in opposite directions, each of said planes terminating in a curved cutting edge, the points along such edge on each of the blades farthest removed from the axis of the shank lying in a common plane perpendicular to the shank axis and constituting cutting points for the root of a thread; the outer surface of each blade being raked back from said cutting edges whereby said planes are inclined to the shank axis in two coordinates; corresponding points along said curved cutting edges, at progressively shorter distances from the shank axis, being at progressively greater distances from the common plane perpendicular to the shank axis and in which said outermost points lie.

2. In an apparatus for cutting threads in nonmetallic objects of cylindrical form the combination of: means for rotating a cylindrical object about its axis; a cutter shank mounted for rotation about an axis parallel to but spaced from the axis of the object; and means for advancing the shank along its axis of rotation in timed relation to the rotation of the object; said shank being provided with a pair of symmetrically disposed, radially extending cutting blades, each blade having an outer surface lying in a plane deviating from a plane perpendicular to the axis of the shank by one-half the root angle of thread to be cut, said surfaces facing in opposite directions, each of said planes terminating in a curved cutting edge, the points along such edge on each of the blades farthest removed from the axis of the shank lying in a common plane perpendicular to the shank axis and constituting cutting points for the root of a thread; the outer surface of each blade being raked back from said cutting edges whereby said planes are inclined to the shank axis in two coordinates; corresponding points along said curved cutting edges, at progressively shorter distances from the shank axis, being at progressively greater distances from the common plane perpendicular to the shank axis and in which said outermost points lie.

CLARENCE BRANT KEYS.

References Cited in the file of this patent

UNITED STATES PATENTS

| Number | Name | Date |
| --- | --- | --- |
| 1,003,584 | Calahan | Sept. 19, 1911 |
| 2,118,989 | Thomas | May 31, 1938 |